(12) United States Patent
Kim et al.

(10) Patent No.: US 12,202,743 B2
(45) Date of Patent: Jan. 21, 2025

(54) DIRECT REMOVAL OF CARBON DIOXIDE FROM OCEANWATER BASED ON A COMPOSITE MEMBRANE

(71) Applicant: Captura Corp., Pasadena, CA (US)

(72) Inventors: Soomin Kim, Thousand Oaks, CA (US); Ibadillah Ardhi Digdaya, Whittier, CA (US); Sreevalli Bokka, Montebello, CA (US); Chengxiang Xiang, San Marino, CA (US)

(73) Assignee: Captura Corp., Pasadena, CA (US)

( * ) Notice: Subject to any disclaimer, the term of this patent is extended or adjusted under 35 U.S.C. 154(b) by 0 days.

(21) Appl. No.: 18/611,463

(22) Filed: Mar. 20, 2024

(65) Prior Publication Data
US 2024/0317610 A1  Sep. 26, 2024

Related U.S. Application Data

(60) Provisional application No. 63/491,507, filed on Mar. 21, 2023.

(51) Int. Cl.
*B01D 53/22* (2006.01)
*B01D 69/02* (2006.01)
(Continued)

(52) U.S. Cl.
CPC ............... *C02F 1/20* (2013.01); *B01D 69/02* (2013.01); *B01D 69/107* (2022.08); *B01D 69/108* (2022.08); *B01D 69/12* (2013.01); *B01D 71/26* (2013.01); *B01D 71/261* (2022.08); *B01D 71/36* (2013.01); *B01D 71/701* (2022.08);
(Continued)

(58) Field of Classification Search
None
See application file for complete search history.

(56) References Cited

U.S. PATENT DOCUMENTS

| 4,761,209 A | 8/1988 | Bonaventura et al. |
| 5,662,837 A * | 9/1997 | Saito ................. B01F 23/23762 |
| | | 261/DIG. 7 |

(Continued)

FOREIGN PATENT DOCUMENTS

| CA | 2174341 C | * 11/2005 | ............. B01D 53/22 |
| JP | 09276603 A | * 10/1997 | |
| JP | 2010163561 A | * 7/2010 | |

OTHER PUBLICATIONS

Hwang "Fundamentals of membrane transport" Korean J. Chem. Eng., 28(1), 1-15 (2011) (Year: 2011).*
(Continued)

*Primary Examiner* — Anthony R Shumate
(74) *Attorney, Agent, or Firm* — Henry Patent Law Firm PLLC

(57) ABSTRACT

In a general aspect, a composite contact composite membrane for direct removal of carbon dioxide from oceanwater is presented. In some cases, a composite membrane includes a supporting layer having a first surface and a second, opposite surface; and a carbon dioxide selective layer disposed on the first surface. The carbon dioxide selective layer is configured to contact an aqueous solution including dissolved carbon dioxide and to selectively transport the dissolved carbon dioxide from the aqueous solution through the supporting layer to the second opposite surface.

20 Claims, 11 Drawing Sheets

(51) Int. Cl.
*B01D 69/10* (2006.01)
*B01D 69/12* (2006.01)
*B01D 71/26* (2006.01)
*B01D 71/36* (2006.01)
*B01D 71/70* (2006.01)
*C02F 1/20* (2023.01)
*C02F 1/44* (2023.01)
*C02F 1/66* (2023.01)
*C02F 103/08* (2006.01)

(52) U.S. Cl.
CPC .............. *C02F 1/44* (2013.01); *C02F 1/66* (2013.01); *B01D 2325/04* (2013.01); *C02F 2103/08* (2013.01)

(56) References Cited

U.S. PATENT DOCUMENTS

| | | | | |
|---|---|---|---|---|
| 6,120,689 | A * | 9/2000 | Tonelli | B01D 61/04 210/85 |
| 2003/0094406 | A1* | 5/2003 | Smith | B01D 65/022 210/96.2 |
| 2004/0232004 | A1* | 11/2004 | Sawamoto | C25B 1/13 205/629 |
| 2011/0160039 | A1* | 6/2011 | Himeno | B01J 29/70 502/4 |
| 2011/0281959 | A1* | 11/2011 | DiMascio | C25B 9/19 205/637 |
| 2013/0287958 | A1* | 10/2013 | Oouchi | B05D 7/24 118/66 |
| 2014/0137740 | A1 | 5/2014 | Aburaya et al. | |
| 2016/0008764 | A1* | 1/2016 | Yoneyama | B01D 67/0097 118/712 |
| 2016/0008767 | A1* | 1/2016 | Yoneyama | B01D 53/228 427/245 |
| 2016/0008768 | A1* | 1/2016 | Yoneyama | B01D 69/1071 427/245 |
| 2016/0074814 | A1* | 3/2016 | Park | B01D 71/76 210/500.33 |
| 2016/0257577 | A1* | 9/2016 | Harper, Jr. | C02F 3/322 |
| 2016/0367936 | A1* | 12/2016 | Ukai | B01D 53/80 |
| 2017/0056839 | A1* | 3/2017 | Ho | B01D 67/0006 |
| 2017/0157574 | A1* | 6/2017 | Li | B01D 61/027 |
| 2019/0060835 | A1* | 2/2019 | Ding | B01D 53/002 |
| 2019/0144311 | A1* | 5/2019 | Scheu | C02F 9/00 204/537 |
| 2019/0366277 | A1* | 12/2019 | Karunakaran | C08L 71/00 |
| 2021/0229031 | A1 | 7/2021 | Sandru et al. | |
| 2022/0219125 | A1 | 7/2022 | Pinnau et al. | |
| 2022/0388880 | A1* | 12/2022 | Sasaki | B01D 61/08 |
| 2023/0024915 | A1 | 1/2023 | Hopkinson et al. | |
| 2023/0107163 | A1* | 4/2023 | Xiang | B01J 31/06 210/638 |
| 2024/0025785 | A1* | 1/2024 | Gan | C02F 1/008 |
| 2024/0132381 | A1* | 4/2024 | Hatton | B01D 19/0084 |

OTHER PUBLICATIONS

Machine translation JP 2010163561 A (Year: 2010).*
Machine translation JP H09276603 A (Year: 1997).*
Merkel, et al., "Gas sorption, diffusion, and permeation in poly(dimethylsiloxane", Journal of Polymer Science: Part B: Polymer Physics, vol. 38, 415-434, Jan. 4, 2000, 20 pages.
Merkel, et al., "Mixed-gas permeation of syngas components in poly(dimethylsiloxane) and poly(1-trimethylsilyl-1-propyne) at elevated temperatures", Journal of Membrane Science 191 (2001) 85-94, Sep. 30, 2001, 10 pages.
Mohr, et al., "Surface fluorination of composite membranes. Part I. Transport properties", Journal of Membrane Science, 55 (1991) 131-148, 1991, 18 pages.
Nakagawa, et al., "Polyacetylene derivatives as membranes for gas separation", Gas separation & Purification, 1988, vol. 2., 1988, 6 pages.
Pinnau, et al., "Gas and vapor transport properties of amorphous perfluorinated copolymer membranes based on 2,2-bistrifluoromethyl-4,5-difluoro-1,3-dioxole/tetrafluoroethylene", Journal of Membrane Science 109 (1996) 125-133., Jan. 10, 1996, 9 pages.
"A Research Strategy for Ocean-based Carbon Dioxide Removal and Sequestration", The National Academies of Sciences Engineering and Medicine, 2022, 323 pages.
Bazhenov, Stepan D., et al., "Gas-Liquid Hollow Fiber Membrane Contactors for Different Applications", Fibers, vol. 6, No. 4, Oct. 10, 2018, 41 pages.
Digdaya, Ibadillah A., et al., "A direct coupled electrochemical system for capture and conversion of CO2 from oceanwater", Nature Communications, vol. 11, No. 1, 2020, 10 pages.
Ji, Jing, et al., "Poly(vinylidene fluoride) (PVDF) membranes for fluid separation", Reactive & Functional Polymers, vol. 86, pp. 134-153, 2015, 20 pages.
Kim, Seungju, et al., "Gas-liquid membrane contactors for carbon dioxide separation: A review", Chemical Engineering Journal, vol. 411, Jan. 19, 2021, 26 pages.
Kumar, P. S., et al., "New absorption liquids for the removal of CO2 from dilute gas streams using membrane contactors", Chemical Engineering Science, vol. 57, No. 9, pp. 1639-1651, 2002, 13 pages.
Merkel, T. C., et al., "Gas Sorption, Diffusion, and Permeation in Poly(dimethylsiloxane)", Journal of Polymer Science, Part B: Polymer Physics, vol. 38, pp. 415-434, 2000, 20 pages.
Nakatsuka, Shuji, et al., "Drinking water treatment by using ultrafiltration hollow fiber membranes", Desalination, vol. 106, No. 1-3, pp. 55-61, 1996, 7 pages.
Pandey, Pratibha, et al., "Membranes for gas separation", Progress in Polymer Science, vol. 26, No. 6, pp. 853-893, 2001, 41 pages.
Robb, W. L., "Thin Silicone Membranes—Their Permeation Properties and Some Applications", Annals of the New York Academy of Sciences, vol. 146, No. 1, 1968, 1 page.
ISA, International Search Report and Written Opinion issued in Application No. PCT/US2024/020772 on Aug. 8, 2024, 17 pages.

* cited by examiner

DIRECT REMOVAL OF CARBON DIOXIDE FROM OCEANWATER BASED ON A COMPOSITE MEMBRANE

CROSS-REFERENCE TO RELATED APPLICATIONS

This application claims priority to U.S. Provisional Patent Application No. 63/491,507, filed Mar. 21, 2023, entitled "Direct Removal of Carbon Dioxide from Oceanwater based on a Composite Membrane." The above-referenced priority document is incorporated herein by reference in its entirety.

GOVERNMENT SUPPORT

This invention was made with government support under Contract No. DE-AR001636 awarded by the Advanced Research Projects Agency of the U.S. Department of Energy. The government has certain rights in the invention.

TECHNICAL FIELD

The following description relates direct removal of carbon dioxide from oceanwater based on a composite membrane.

BACKGROUND

Direct ocean capture (DOC) technologies are a promising option for servicing a very large and diverse carbon removal industry needed to mitigate legacy carbon dioxide emissions that are exacerbating anthropogenic climate change. Robust, energy efficient, and low-cost strategies for direct removal of carbon dioxide from oceanwater and other natural waters are focused to address challenges and opportunities specifically found in operation in an oceanic environment.

DETAILED DESCRIPTION

In some aspects of what is described here, a composite membrane is used in liquid degassing applications particularly for carbon dioxide removal in a direct ocean capture (DOC) system. In certain examples, a composite membrane may include one or more carbon dioxide selective layers supported on a supporting structure (e.g., a planar composite membrane, a hollow fiber composite membrane structure, or another type of supporting structure). In some instances, a contactor module may house multiple composite membranes. In some instances, the multiple composite membrane in a contactor module may be configured such that, during operation, the carbon dioxide selective layer of the composite membrane may be in contact with a liquid feed stream (e.g., oceanwater) flowing across the surface on a first side of the composite membrane; and a sweep gas or vacuum may be applied on a second opposite side of the composite membrane. The contactor module, during operation, allows carbon dioxide transport across the one or more carbon dioxide selective layers and the supporting structure from the first side to the second opposite side of the composite membranes, while preventing or minimizing liquid or water flow through. In other words, the carbon dioxide selective layer can selectively transport the dissolved carbon dioxide; and the dissolved carbon dioxide in the aqueous solution can selectively permeate through the carbon dioxide selective layer. In some implementations, a DOC system may include one or more contactor modules.

In some implementations, the systems and techniques described here can provide technical advantages and improvements. For example, the systems and techniques can maximize mass transfer area per unit volume; enables efficient carbon dioxide stripping in a DOC system; may reduce levelized cost of carbon dioxide from the DOC system; and may improve energy efficiency of a DOC system. In some instances, the systems and techniques can also reduce competition for useful land; allow access to oceanic carbon dioxide storage sites; and produce valuable carbon dioxide streams offshore for fuel and chemical synthesis; and allow a direct reversal of ocean acidification caused by anthropogenic carbon dioxide emissions. In some cases, a combination of these and potentially other advantages and improvements may be obtained.

Figure 1:
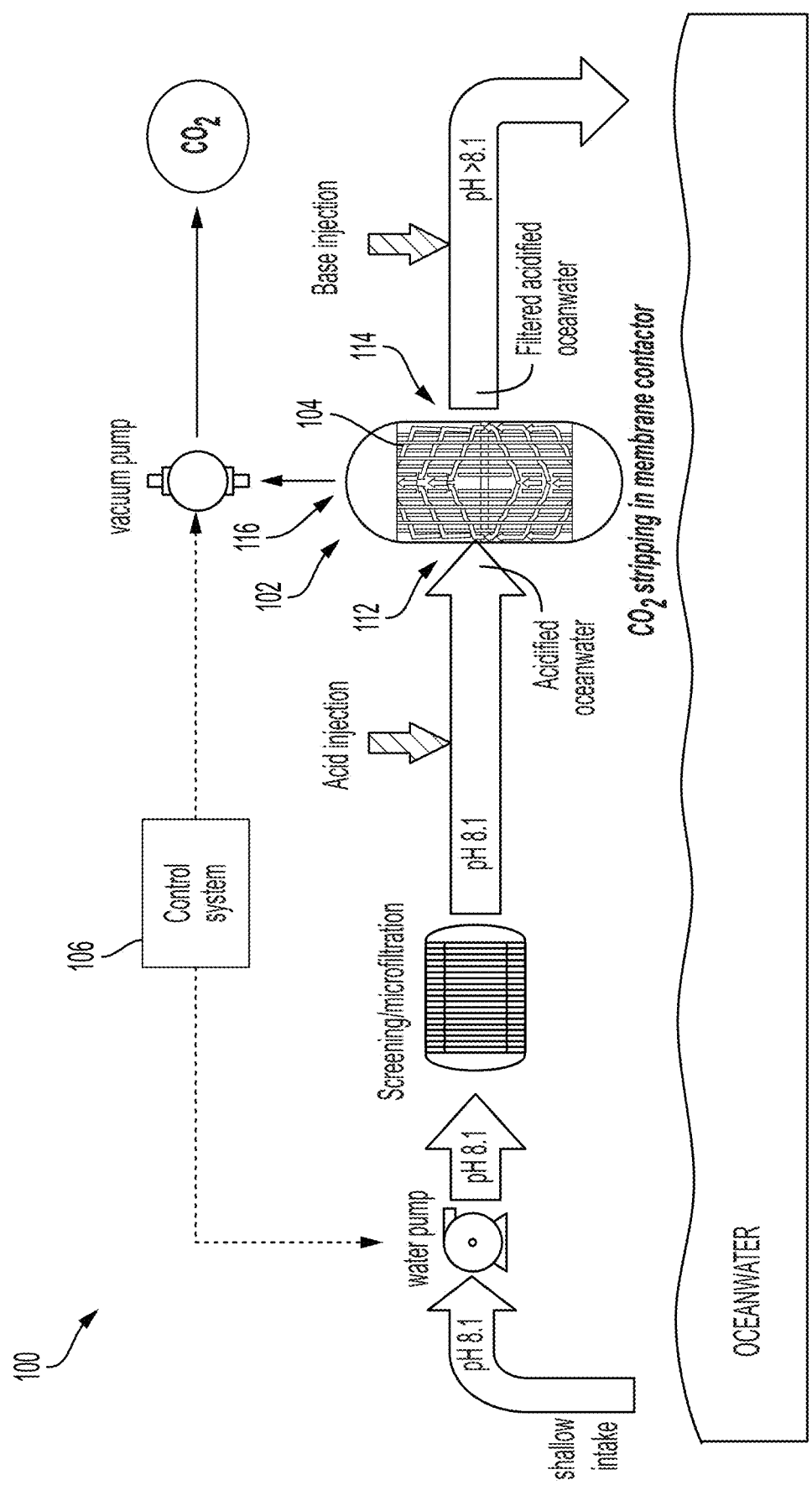
FIG. 1 is a schematic diagram showing aspects of an example direct ocean capture (DOC) system.

FIG. 1 is a block diagram of an example direct ocean capture (DOC) system 100. The example DOC system 100 shown in FIG. 1 includes one or more contactor modules 102 and a control system 106. Each of the one or more contactor modules 102 includes one or more composite membranes 104. The one or more composite membranes 104 in a contactor module 102 are configured such that the contactor module 102 is separated into at least one first chamber for flowing oceanwater and at least one second chamber for collecting carbon dioxide gas. The DOC system 100 may include additional or different features, and the components of the DOC system may operate as described with respect to FIG. 1 or in another manner.

In some implementations, the first chamber of the contactor module 102 is configured to receive and contact the oceanwater containing dissolved carbon dioxide gas. In some instances, the oceanwater which has a pH value of 8.1 may be acidified before being received at the contactor module 102. In other words, the pH value of the oceanwater received at an input port of the contactor module 102 may be reduced; and an acidified oceanwater is in contact with the surface of the composite membranes 104 facing the first chamber. For example, the pH value of the acidified oceanwater may be equal to or greater than 6, 5, 4, or another value. In certain instances, the oceanwater may be screened, filtered, heated, or processed in another manner prior to the acidification process.

In some implementations, the acidification process includes mixing an acidic solution with the processed oceanwater. In some instances, the acidic solution includes chloric acid (HCl), or other types of acid. In some instances, the acidic solution used to obtain the acidified oceanwater may be generated onsite as part of the example DOC system 100 using an electrodialysis process or obtained in another manner. In some implementations, the acidic solution introduced to the oceanwater during the acidification process can react with dissolved inorganic carbon in forms of bicarbonate and carbonate in the oceanwater; and can convert the dissolved inorganic carbon to carbon dioxide gas and increase the concentration of the dissolved carbon dioxide gas in the acidified oceanwater. In some instances, other processes or other treatment to the oceanwater to increase the concentration of the dissolved carbon dioxide gas may be used.

In some implementations, the composite membranes 104 is configured to selectively remove the dissolved carbon dioxide gas from the acidified oceanwater. For example, as the acidified oceanwater flows through the first chamber from a first end connected to a liquid inlet 112 of the contactor module 102 to a second, opposite end connected to a liquid outlet 114 of the contactor module 102 and vacuum or gas sweep applied in the second chamber, the concentration of the dissolved carbon dioxide gas in the acidified oceanwater in the first chamber decreases in the direction of the liquid flow. The composite membranes 104 contact the acidified oceanwater and selectively permeate the dissolved carbon dioxide gas in the acidified oceanwater to transport across the composite membranes 104. In other words, the dissolved carbon dioxide gas can be separated by the composite membranes 104 from the acidified oceanwater in the first chamber to the second chamber. The dissolved carbon dioxide gas can be removed from the first chamber and collected in the second chamber. In some implementations, permeated carbon dioxide gas is collected at a gas outlet 116 of the contactor module 102.

In some implementations, the control system 106 is communicably coupled to one or more control units (e.g., water pumps, flow sensor, vacuum pumps, pressure sensor, etc.) to adjust the pH and the flow rate of the oceanwater through the first chamber, and the flow rate of the sweep gas or vacuum (e.g., partial pressure) applied in the second chamber. In some instances, the control system 106 may be coupled to other components of the DOC system 100 to control other parameters. For example, the control system 106 may be coupled to a gas chromatograph configured to analyze and evaluate the carbon dioxide concentration collected from the second chamber, a pH sensor configured to measure the pH values of the oceanwater, a water pump configured to feed the acidic solution to the oceanwater during the acidification process, and other components or devices of the DOC system 100. In some implementations, the control system 106 includes computation apparatus, a memory unit, an input/output interface, or other components that allow the communication of the control system 106 with other components of the DOC system 100, determine control parameter values of the components of the DOC system 100, and optimize the carbon dioxide removing performance of the DOC system 100. In some instances, the control system 106 may be configured for performing other functions.

In some instances, the multiple contactor modules 102 in the DOC system 100 may be connected in series. For example, the oceanwater can go through a series of contactor modules 102 until a certain condition is met (e.g., for example a concentration of the dissolved carbon dioxide gas in the oceanwater is below a predetermined threshold limit). In some instances, the acidified oceanwater can be processed in parallel by simultaneously operating multiple contactor modules to improve production. In some instances, a subset of contactor modules 102 may be connected in series, and multiple subsets of contactor modules 102 may be connected in parallel. The multiple contactor modules 102 may include different types of composite membranes, e.g., including composite membranes 104 that are characterized by different materials or geometric dimensions of the carbon dioxide selective layers, different geometric dimensions (e.g., thickness, inner diameter, porosity, pore size distribution, etc.) of the supporting layers, or different numbers of composite membranes. In some instances, the multiple contactor modules 102 may operate under different conditions (e.g., different pH values, pressure, flow rate, flow direction, etc.). In some instances, output of the DOC system 100 includes the acidified oceanwater with a reduced concentration of the dissolved carbon dioxide gas. The acidified oceanwater from the liquid outlet 114 of the contactor module 102 may be neutralized by injecting an alkaline solution (e.g., sodium hydroxide NaOH) to increase its pH value during an alkalinization process prior to being returned back to the ocean. In some instances, the carbon dioxide gas collected from the multiple composite membranes 104 may be collected for later processing.

Figure 2A:
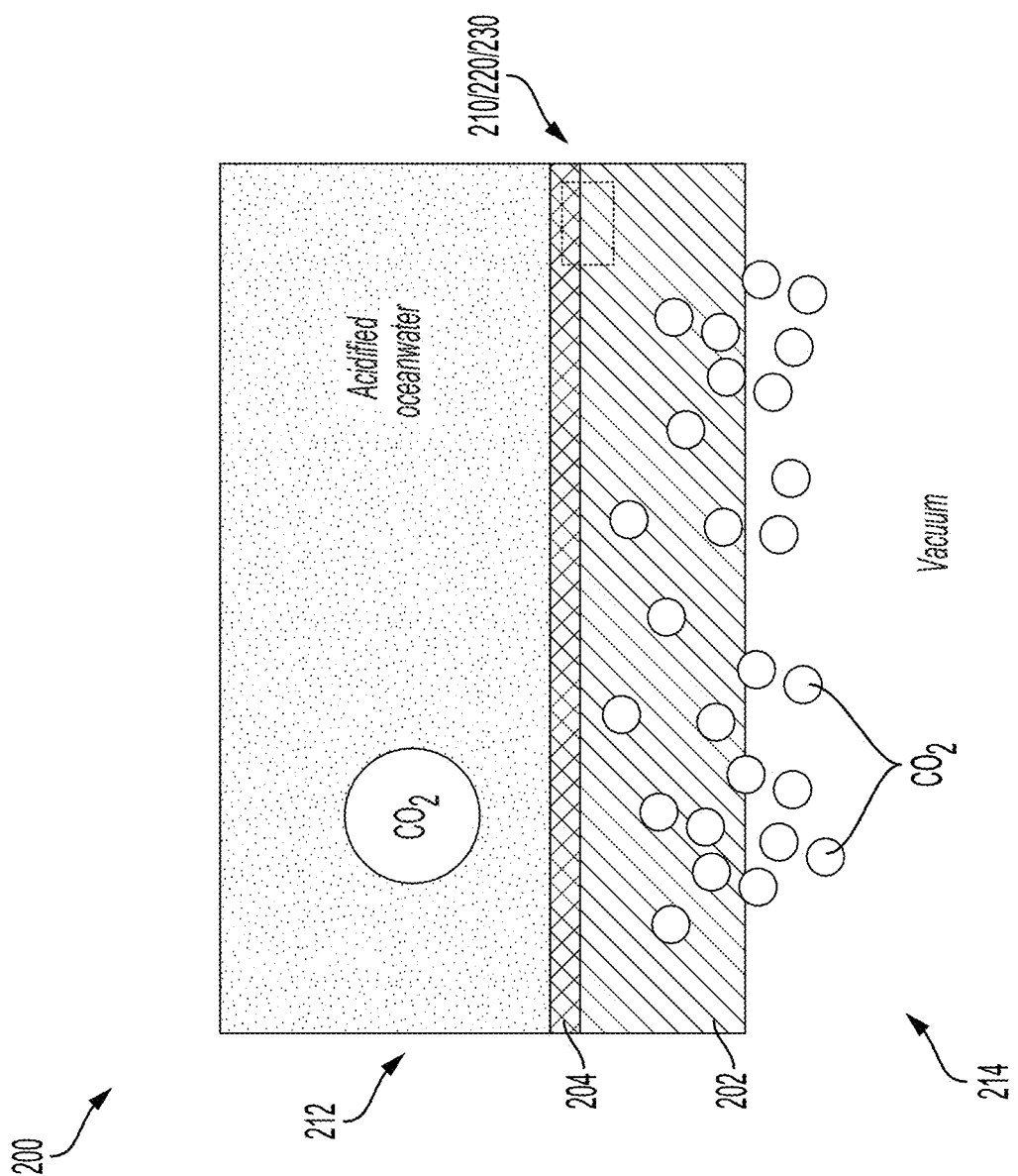
FIGS. 2A-2B include schematic diagrams showing aspects of an example composite membrane.
Figure 2B:
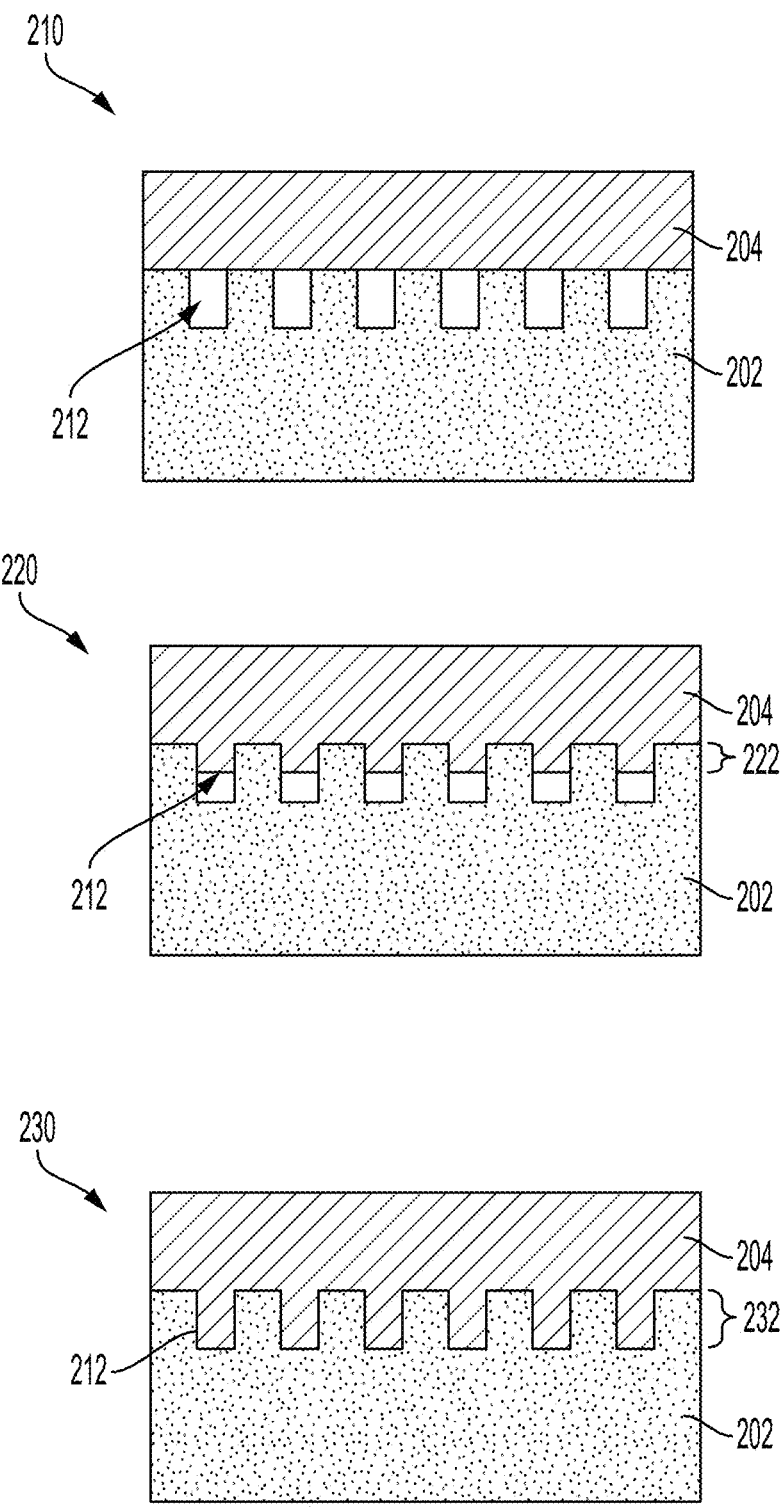

FIGS. 2A-2B include schematic diagrams showing aspects of an example composite membrane 200. The example composite membrane 200 includes a supporting layer 202 and a carbon dioxide selective layer 204 disposed on a first surface of the supporting layer 202. In some implementations, the composite membrane 200 has a planar bilayer composite membrane structure. The thickness of the supporting layer 202 is equal to or greater than 10, 50, 100, 200 micrometers or another value, and the thickness of the carbon dioxide selective layer is equal to or less than 50, 20, 10 micrometers, or another value. In some implementations, the carbon dioxide selective layer 204 and the supporting layer 202 have stable chemical and mechanical stability under the operation condition of the composite membrane 200, e.g., under vacuum, under a certain pressure differential, in contact with a flowing acidified oceanwater stream, etc. The carbon dioxide selective layer 204 has a selectivity of the dissolved carbon dioxide in the oceanwater over other dissolved gases in the oceanwater (e.g., oxygen, nitrogen, etc.). In some implementations, the selectivity of the carbon dioxide selective layer of permeating $CO_2$ over $N_2$ or $O_2$ (e.g., permeability of $CO_2$/permeability of $N_2$ or $O_2$) is greater than 1. For example, the selectivity of the carbon dioxide selective layer of permeating $CO_2$ over $N_2$ (e.g., permeability of $CO_2$/permeability of $N_2$) is in the ranges of 3.4-9.5; and the selectivity of carbon dioxide selective layer of permeating $CO_2$ over $O_2$ (e.g., permeability of $CO_2$/ permeability of $N_2$) and 2.4-4.8. In some instances, the composite membrane 200 may be implemented as the composite membrane 104 in FIG. 1 or in another manner. In some implementations, the composite membrane 200 includes a polymer or polymer mixture configured to reduce the solubility of water/water vapor in the carbon dioxide selective layer 204 and reduce water transport while maintaining the efficient $CO_2$ transport. In some implementations, the composite membrane 200 is configured in a contact module (e.g., the contact module 102 in FIG. 1) such that the contact module is divided into a first chamber 212 and a second chamber 214; and the composite membrane 200 enables high $CO_2$ removal efficiency from the aqueous solution in the first chamber 212 to the second chamber 214.

Figure 7:
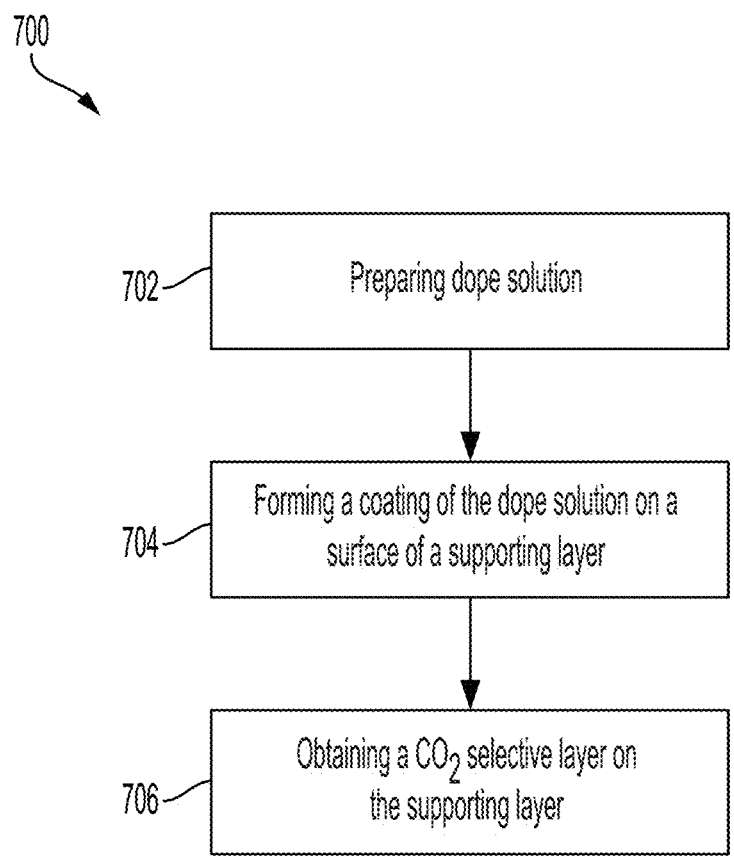
FIG. 7 is a flow chart showing aspects of an example process for fabricating a composite membrane.
Figure 8:
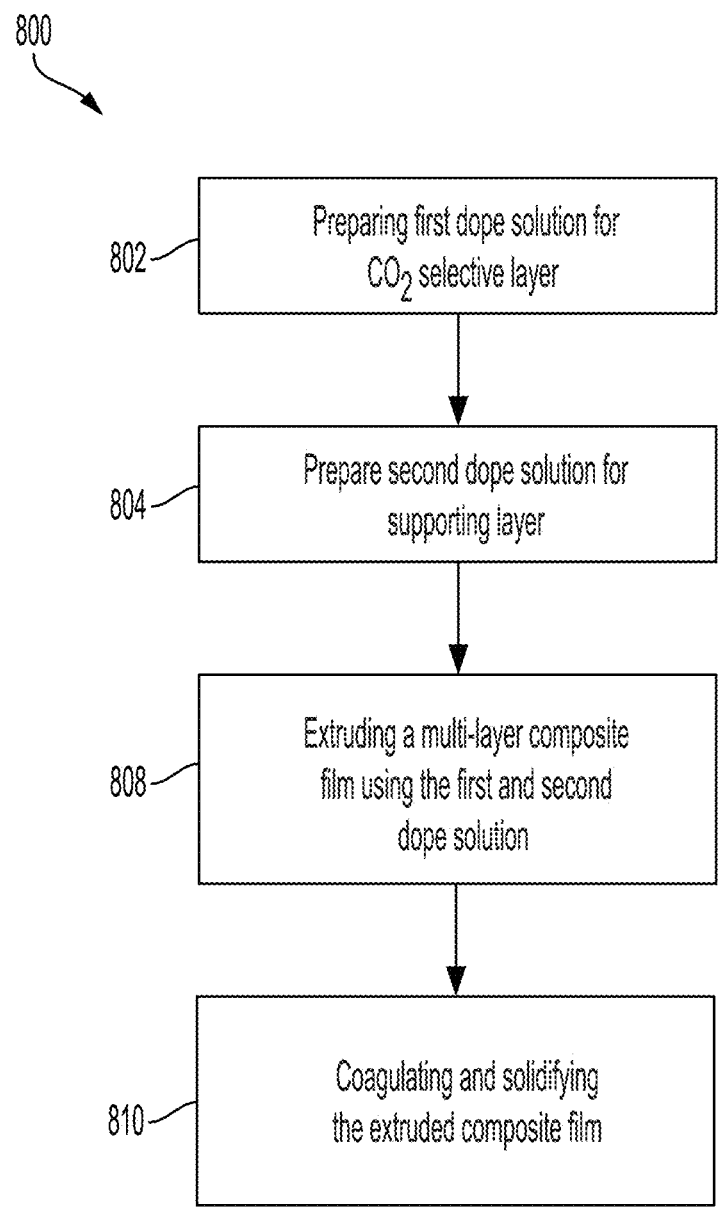
FIG. 8 is a flow chart showing aspects of an example process for fabricating a composite membrane.

During operation, the composite membrane 200 may be configured in a contactor module (e.g., the contactor module 102 in the DOC system 100 of FIG. 1) such that the liquid (e.g., the acidified oceanwater as shown in FIG. 1) at the carbon dioxide selective layer 204; and a vacuum is applied on a second, opposite surface of the supporting layer 202. In this case, the carbon dioxide migrates across the carbon dioxide selective layer 204 and then across the supporting layer 202 from the first surface to the second opposite surface of the supporting layer 202. In some instances, the composite membrane 200 may be configured in a contactor module in another manner, for example, the composite membrane 200 may be configured such that the second surface of the supporting layer 202 is in direct contact with the oceanwater and collecting the carbon dioxide from the carbon dioxide selective layer 204. In some instances, the supporting layer 202 of the composite membrane 200 may be configured in another manner, e.g., sandwiched between two or more carbon dioxide selective layers 204. In some instances, the example composite membrane 200 may be implemented as the composite membrane 104 in FIG. 1 or in another manner; may be operated to perform operations in the example process 400 FIG. 4 or in another manner; and may be fabricated using operations in the example process 700, 800 as shown in FIGS. 7 and 8, or in another manner.

In some implementations, the supporting layer 202 includes a single layer of polysulfone (PSf), a single layer of polyethersulfone (PES), a single layer of polyvinylidene fluoride (PVDF), a single layer of a ceramic material, or a single layer of another material. In some instances, the supporting layer 202 includes a single layer of a mixture of two or more of the following materials, including polysulfone (PSf), polyethersulfone (PES), polyvinylidene fluoride (PVDF), a ceramic material, or another material. In some instances, the supporting layer includes two or more layers of the following materials, including polysulfone (PSf), polyethersulfone (PES), polyvinylidene fluoride (PVDF), a ceramic material, or another material.

In some implementations, the carbon dioxide selective layer 204 includes a single layer of a silicone-based polymer, a single layer of a polyolefins-based polymer, a single layer of a fluoropolymer, a single layer of polyacetylene derived polymers, or a single layer of another type of carbon dioxide selective material. In some implementations, the carbon dioxide selective layer 204 includes a single layer of a mixture of two or more of the following materials, a silicone-based polymer, a polyolefins-based polymer, a fluoropolymer, a polyacetylene derived polymer, or another type of carbon dioxide selective material. In some implementations, the carbon dioxide selective layer 204 includes two or more layers of the following materials, including a silicone-based polymer, a polyolefins-based polymer, a fluoropolymer, or another type of carbon dioxide selective material. The silicon-based polymer includes polydimethylsiloxane (PDMS), or another silicon-based polymer; the polyolefins-based polymer includes polymethylpentene (PMP), or another polyolefins-based polymer; the fluoropolymer includes polytetrafluoroethylene (PTFE) or another type of fluoropolymer; and the polyacetylene derived polymer includes poly(1-trimethylsilyl-1-propyne) (PTMSP) or another type of polyacetylene derived polymer.

In some instances, the supporting layer 202 has a porous structure; and the stacking of the carbon dioxide selective layer 204 on the porous structure of the supporting layer 202 may result in a different overall interface structure of the composite membrane 200. As shown in FIG. 2B, the carbon dioxide selective layer 204 in the composite membrane 210 may have an abrupt interface with the supporting layer 202. In this case, the surface pores 212 of the porous supporting layer 202 may not be filled with the carbon oxide selective layer 204, e.g., no intrusion layer. As also shown in FIG. 2B, the surface pores 212 of the porous supporting layer 202 in the composite membrane 220 may be partially filled with the carbon dioxide selective layer 204, e.g., forming an intrusion layer 222 in at least some of the surface pores of the supporting layer 202. In some instances, the intrusion layer 232 can extend all the way through the surface pores 212. In other words, the surface pores 212 of the porous supporting layer 202 may be completely filled with the carbon dioxide selective layer 204, as shown in the composite membrane 230. In some instances, the interface structure of a composite membrane 200 may be a combination of the interface structure shown in FIG. 2B.

Figure 3A:
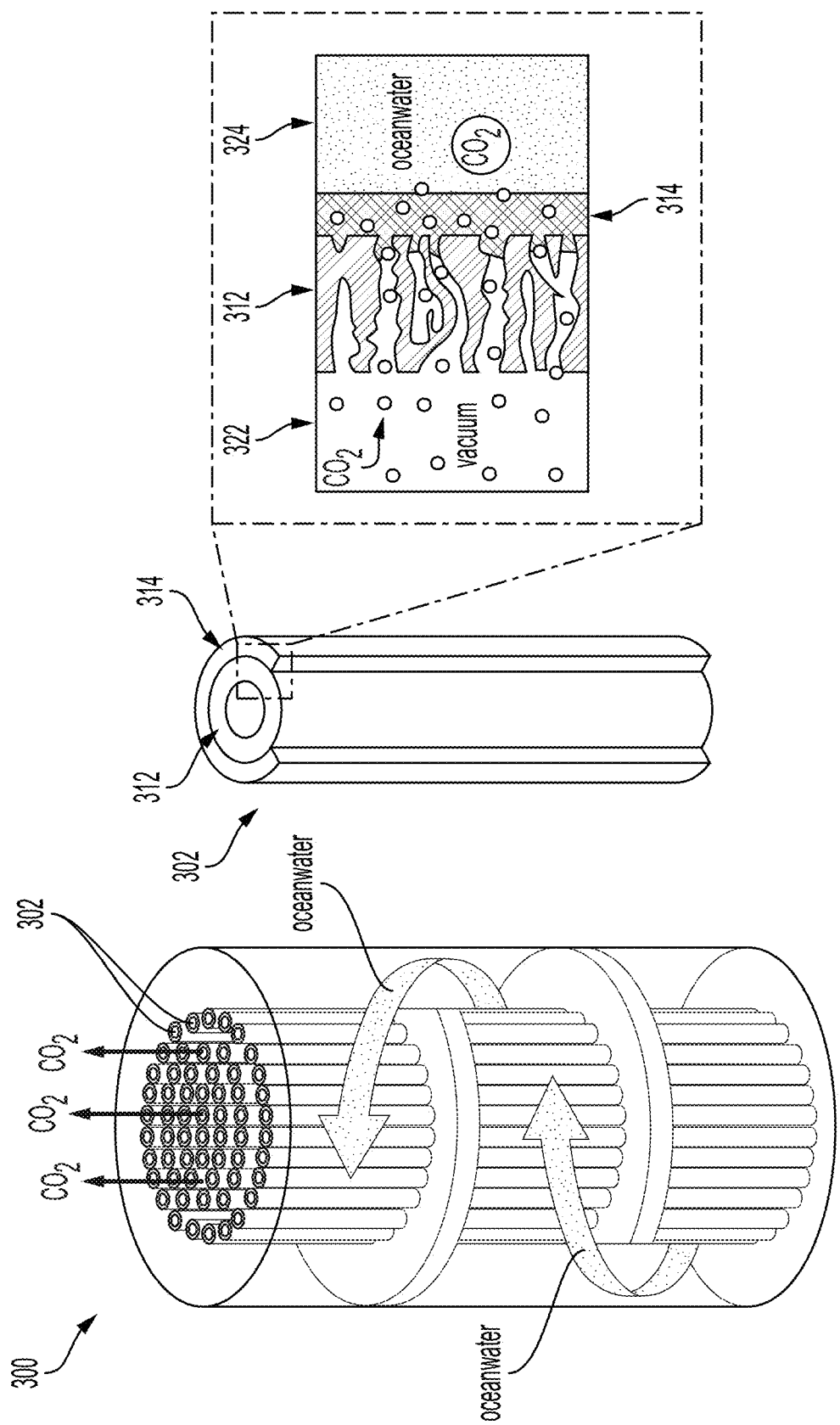
FIG. 3A is a schematic diagram showing aspects of an example contactor module.

FIG. 3A is a schematic diagram showing aspects of an example contactor module 300. The example contact module 300 includes multiple composite membranes 302 having a hollow fiber composite membrane structure. In some instances, the example contact module 300 may be implemented as the contact module 102 in FIG. 1 or in another manner; and may be operated to perform operations in the example process 400 FIG. 4 or in another manner.

As shown in FIG. 3A, each composite membrane 302 in the contactor module 300 includes a supporting layer 312 and a carbon dioxide selective layer 314. The carbon oxide selective layer 314 is configured for efficiently degassing the liquid (e.g., removing dissolved carbon dioxide gas in acidified oceanwater). The thickness of the carbon dioxide selective layer 314 is equal to or less than 200, 100, 50, 10 micrometers or another value. The supporting layer 312 has a porous hollow fiber composite membrane structure and is configured to provide a high surface area for carbon dioxide gas extraction from the shell side 324 to the lumen side 322. The supporting layer 312 of the composite membrane 302 may be implemented as the supporting layer 202 of the example composite membrane 200 in FIGS. 2A-2B or in another manner. The carbon dioxide selective layer 314 of the composite membrane 302 may be implemented as the carbon dioxide selective layer 204 of the example composite membrane 200 in FIGS. 2A-2B or in another manner. In some implementations, the composite membrane 302 with the hollow fiber composite membrane structure may be fabricated according to the operations of the example process 600, 700, 800 or in another manner, for example via conventional coating methods such as dip-coating and spray-coating, or chemical deposition followed by curing or drying of the coated fibers to form a thin film layer on the fiber outer surface. The composite membrane 302 is configured to selectively remove gases including carbon dioxide from liquid feed water (e.g., acidified oceanwater) while minimizing or preventing liquid permeation. In some instances, the composite membrane 302 has a carbon dioxide removal efficiency equal to or greater than 50%, 60%, 70%, 80% or another value.

Figure 3B:
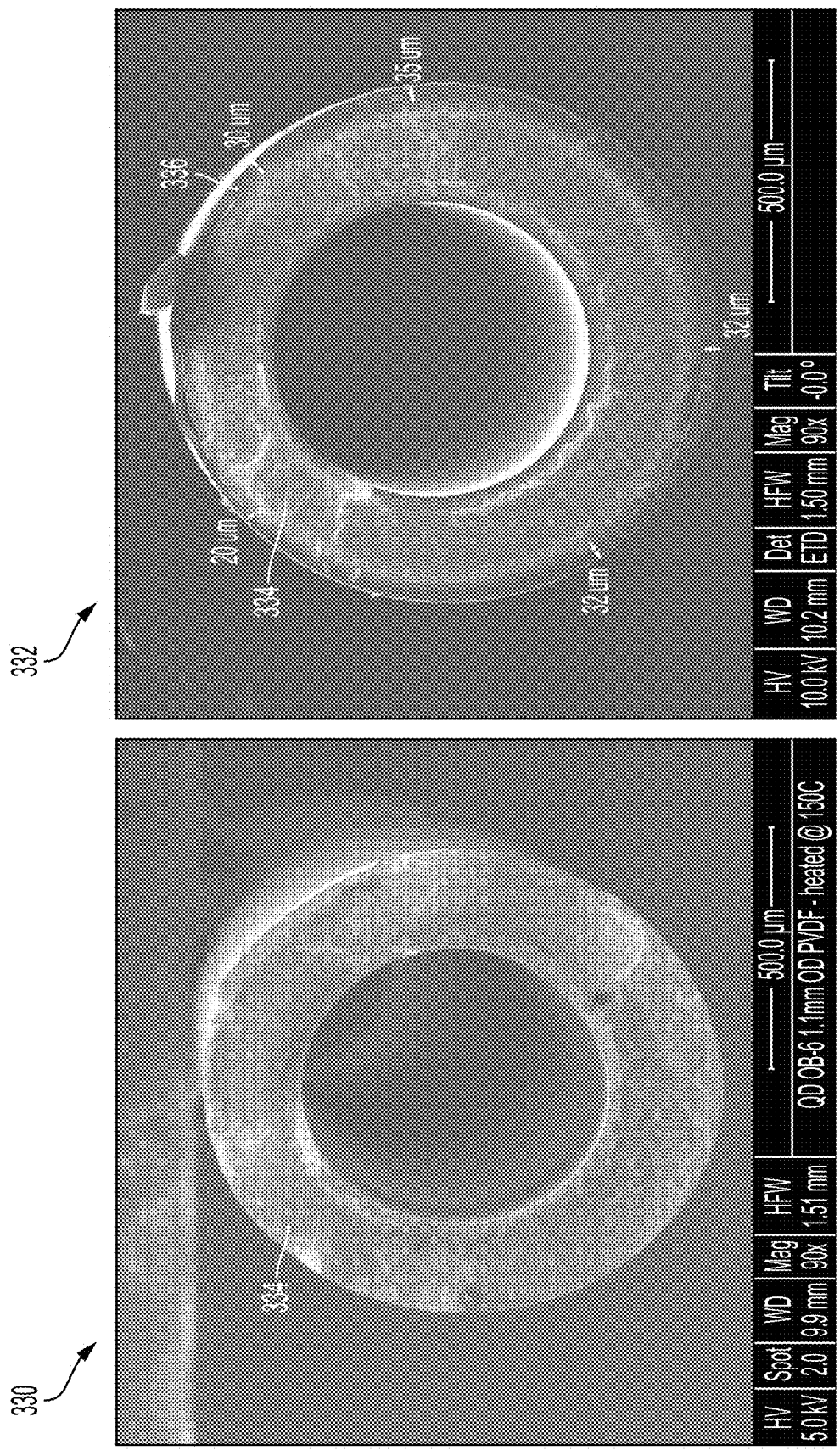
FIG. 3B includes electron microscope images showing cross-sectional views of an example supporting hollow fiber before and after coating a carbon dioxide selective layer in the example contactor module shown in FIG. 3A.

FIG. 3B includes electron microscope images showing cross-sectional views of an example supporting hollow fiber before (330) and after (332) coating a carbon dioxide selective layer 336. The carbon dioxide selective layer 336 is coated on the outer surface of the supporting hollow fiber 334; and includes polydimethylsiloxane (PDMS). The supporting hollow fiber 334 is a polyvinylidene fluoride (PVDF) porous hollow fiber. The thickness of the PDMS carbon dioxide selective layer 336 is in a range of ~20-35 micrometers. The composite membrane 332 with a hollow fiber composite membrane structure shown in FIG. 3B may be used to prepare contactor modules of effective composite membrane area of ~100 cm$^2$ (Table 1).

TABLE 1

Properties of the membrane contactor (MC) modules fabricated using the PDMS-PVDF thin film composite (TFC) hollow fiber composite membranes

| Module type | Transverse flow | Parallel flow |
| --- | --- | --- |
| Base fiber material | PVDF | PVDF |
| Composite fiber OD (mm) | 1.03 | 1.03 |
| Effective fiber length (cm) | 1 | 6 |
| Number of fibers | 320 | 60 |
| Fiber packing density (%) | 50 | 39 |
| Composite membrane active area (cm$^2$) | 104 | 117 |

In some implementations, the fiber packing density can be defined as cross sectional area occupied by the fibers divided by total cross-sectional area for membrane module, which may be equal to number of fibers*pi*(fiber OD/2)^2 divided by pi*(contactor module housing ID)^2/4) (if cylindrical module is employed) or module inner width*module inner length (if rectangular); and the composite membrane active area=total surface area of fibers based on fiber OD=number of fibers*pi*fiber OD*effective fiber length.

Figure 4:
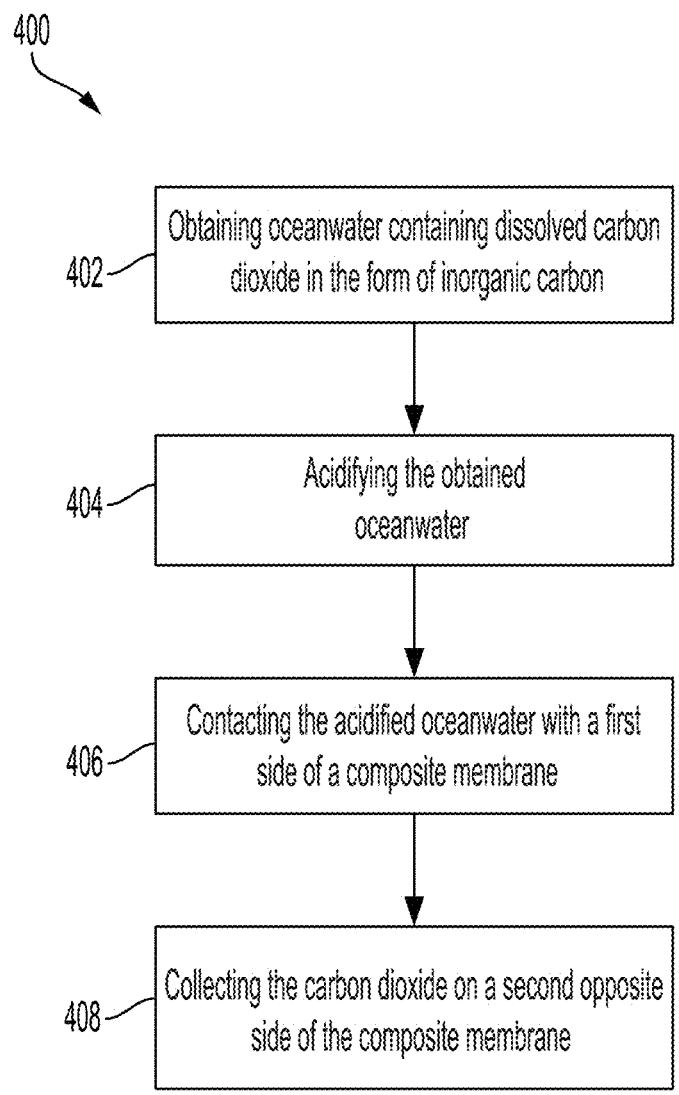
FIG. 4 is a flow chart showing aspects of an example process for direct ocean capture using an example composite membrane.

FIG. 4 is a flow chart showing aspects of an example process 400 for direct ocean capture. The example process 400 can be used, for example, to operate a DOC system, e.g., the example DOC system 100 in FIG. 1. For instance, the example process 400 can be used to perform carbon dioxide removal directly from oceanwater using contactor modules with multiple composite membranes. The composite membranes of the DOC system may be implemented as the composite membranes 104, 200, 210, 220, 230, 302, 332 as shown in FIGS. 1, 2A-2B, 3A, 3B or in another manner. The example process 400 may include additional or different operations, including operations performed by additional or different components, and the operations may be performed in the order shown or in another order. In some implementations, one or more operations in the example process 400 can be performed by a computer system, for instance, by a digital computer system having one or more digital processors (e.g., data processing apparatus of the control system 106 in FIG. 1) that execute instructions (e.g., instructions stored in the memory unit of the control system 106 in FIG. 1).

At 402, oceanwater containing dissolved carbon dioxide is obtained. For example, surface oceanwater may be collected from the ocean. In some instances, the obtained oceanwater may be pre-treated to remove any impurities, debris, or contaminants. In some implementations, the dissolved carbon dioxide in the obtained oceanwater is in the form of inorganic carbon, e.g., carbonate and bicarbonate.

At 404, the obtained oceanwater is acidified. The collected oceanwater is then acidified to increase the concentration of the dissolved carbon dioxide and facilitate the removal of carbon dioxide. This can be done using various acids, such as sulfuric acid ($H_2SO_4$) or hydrochloric acid (HCl), which will react with the carbonates and bicarbonates in the oceanwater, converting them into carbon dioxide gas and increase the concentration of the dissolved carbon dioxide gas in the obtained oceanwater.

At 406, the acidified oceanwater is contacted with a first side of a composite membrane. The acidified oceanwater can be then passed through a contactor module which houses multiple composite membranes. In some instances, a carrier gas (e.g., nitrogen, air, etc.) and/or a vacuum may be applied to a second opposite side of the composite membrane. The acidified oceanwater is brought into contact with the first side of the composite membrane. A composite membrane is configured to selectively transfer carbon dioxide gas from the first side to the second opposite side of the composite membrane. The carrier gas or vacuum applied to the second side is able to provide a partial pressure for efficient carbon dioxide removal, e.g., equal to or less than Henry's constant×($CO_2$ concentration in the liquid).

At 408, the carbon dioxide is collected on the second opposite side of the composite membrane. The carbon dioxide can pass through the composite membrane into the carrier gas and/or vacuum environment. The carrier gas is passed in a separate channel of the contactor module (e.g., to the second chamber 214 of the composite membrane 200 in FIG. 2A, or to the lumen side 322 of the composite membrane 302 in FIG. 3A); processed to remove the carbon dioxide from the rest of the carrier gas. The collected carbon dioxide can be stored for further processing.

Figure 5A:
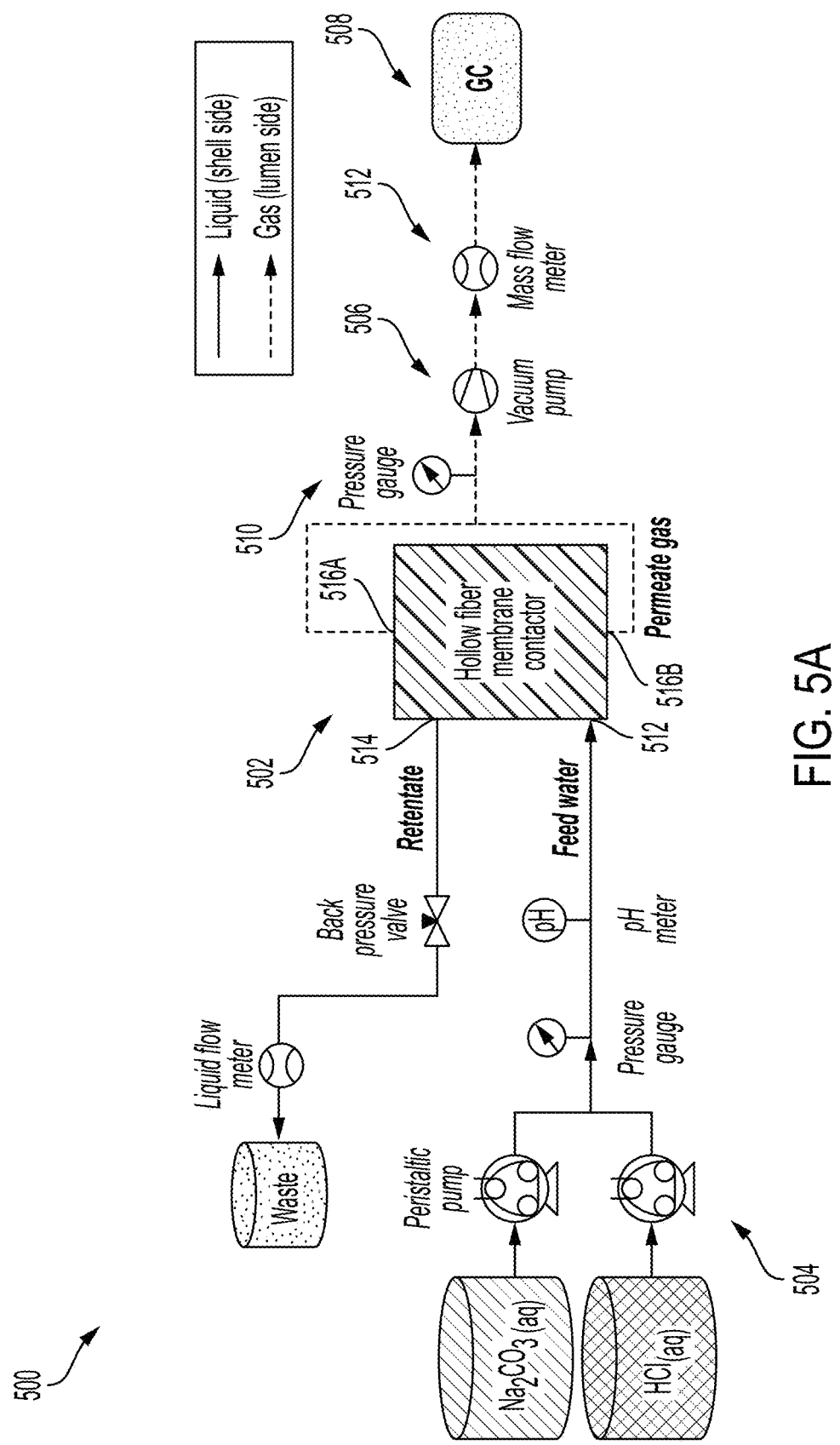
FIG. 5A is a schematic diagram showing an experimental setup of a DOC system.

FIG. 5A is a schematic diagram showing an experimental setup of a DOC system 500. The DOC system 500 includes a contactor module 502 which includes multiple composite membranes 302 shown in FIG. 3A. A feed solution containing 2.2 millimolar (mM) of dissolved carbon dioxide gas with a pH value equal to or greater than 4 can be delivered to a composite membrane by pumping a sodium bicarbonate solution and a hydrochloric acid solution simultaneously to the contactor module 502 using peristaltic pumps 504. The feed side pressure and the feed water pH can be monitored using an analog pressure gauge and a pH meter, respectively. The feed water is delivered to the shell side of the hollow fiber composite membranes (e.g., the shell side 324 as shown in FIG. 3A) at a liquid inlet 512 of the contactor module 502 and collected from a liquid outlet 514 of the contactor module 502, while a vacuum pump 506 can be used to pull the gas from lumen side of the hollow fiber composite membrane at gas outlets 516A, 516B of the contactor module 502. The vacuum pump 506 may be implemented as a diaphragm vacuum pump or another vacuum pump. The composition of the gas collected from the composite membrane can be analyzed using a gas chromatograph 508 (e.g., Multiple gas analyzer #5 from SRI instruments, Torrance, CA). The fiber lumen side gas pressure and the gas flow rate can be measured using a digital pressure gauge 510 and a mass flow meter 512, respectively.

Figure 5B:
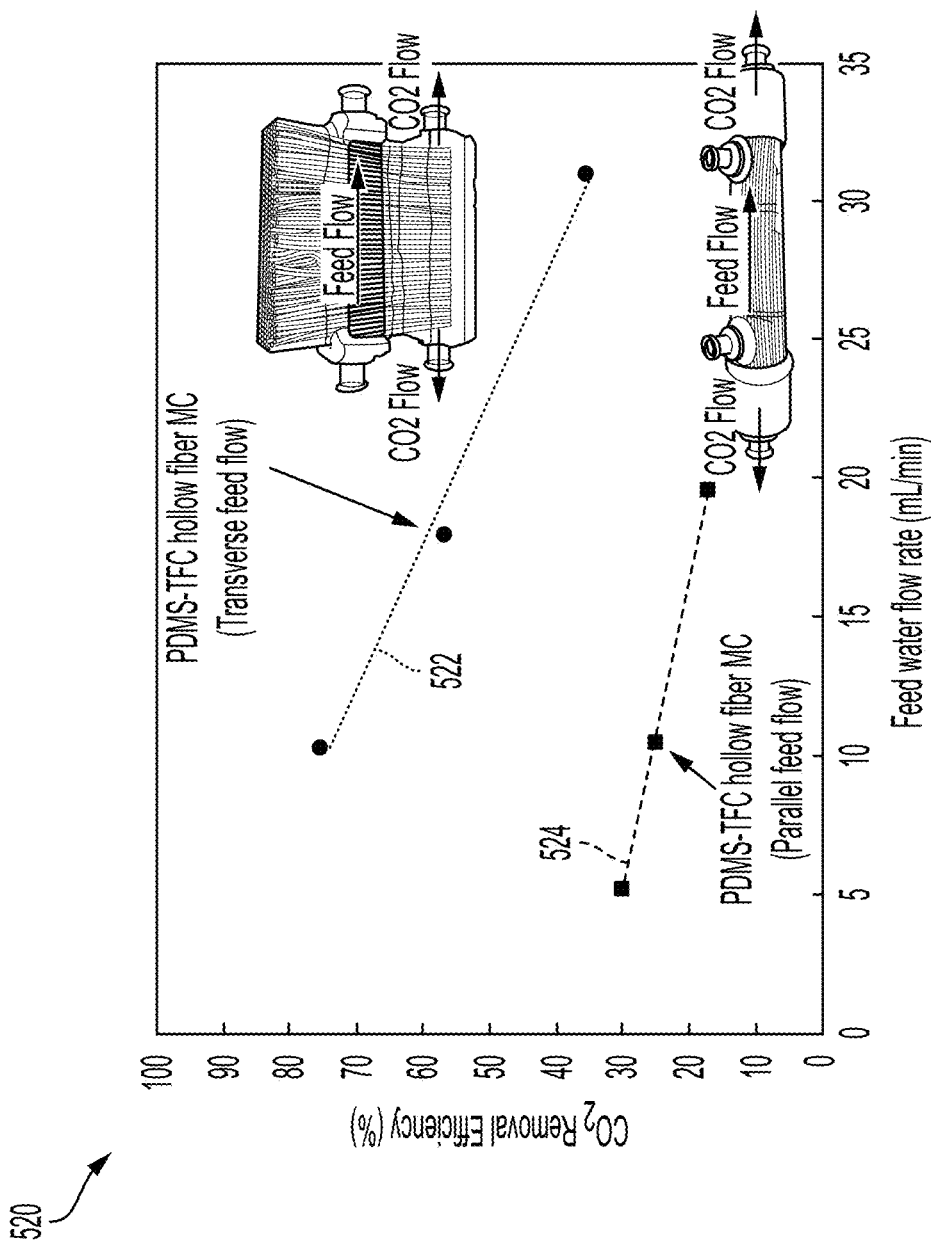
FIG. 5B is a plot showing carbon dioxide removal efficiency in percentage as a function of feed water flow rate in milli-liter per min (mL/min) for various types of composite membrane-based contactor modules.

A model feed solution including 2.2 mM NaHCO$_3$ and 2.6 mM HCl solutions mixed together, can be delivered to the composite membrane shell side at feed flow rates of ~5-30 mL/min, while the vacuum can be applied to the fiber lumen side at ≤20 millibar abs. The composition of the collected gas at the fiber lumen side can be analyzed using a GC using helium as a carrier gas. The system allows to stabilize for each run prior to recording the measurements. The $CO_2$ removal efficiency (defined as a ratio of the molar flow rate $CO_2$ gas extracted from the fiber lumen side and the molar flow rate dissolved $CO_2$ in feed water delivered to the composite membrane) can be maximized at ~75% at a feed flow rate of 10 mL/min (curve 522 in the plot 520 of FIG. 5B) for the transverse flow membrane contactor module (e.g., feedwater flows in the direction perpendicular to fibers) fabricated using the PDMS-TFC-PVDF fibers (Table 1). In case of the parallel flow membrane contactor module (e.g., feedwater flows in the same direction as fibers) fabricated using the same PDMS-TFC-PVDF fibers the $CO_2$ removal efficiency is ~25% at the same feed flow rate of 10 mL/min (curve 524 in the plot 520 of FIG. 5B).

Figure 6:
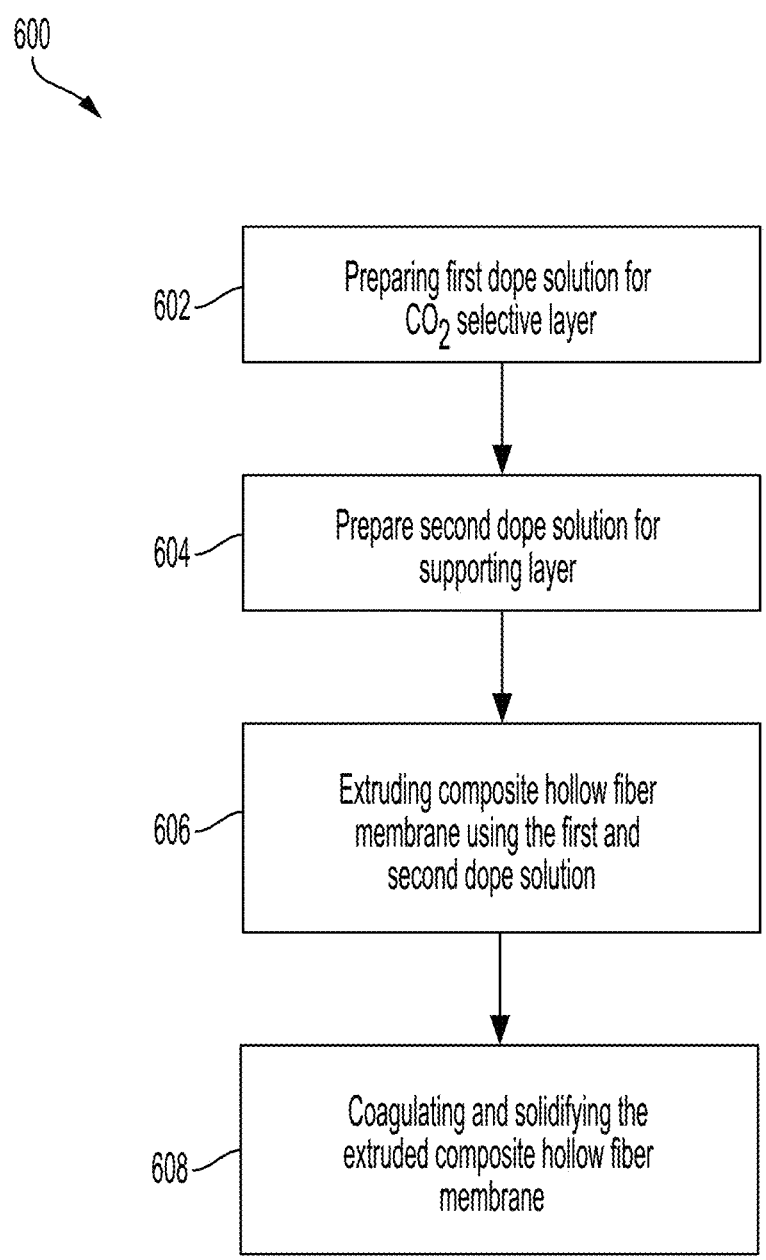
FIG. 6 is a flow chart showing aspects of an example process for fabricating a composite membrane.

FIG. 6 is a flow chart showing aspects of an example fabrication process 600. The fabrication process 600 is used to fabricate the example composite membrane 302 with a composite hollow fiber composite membrane structure shown in FIG. 3A.

At 602, a first dope solution is prepared. For example, the first dope solution includes a material for the carbon dioxide selective layer dissolved in a solvent. A concentration of the material for the carbon dioxide selective layer in the solvent may be controlled depending on the desired properties of the carbon dioxide selective layer. For example, when the carbon dioxide selective layer includes PDMS, the PDMS can be dissolved in a solvent such as toluene or hexane to form the first dope solution. The first dope solution may be loaded in a first syringe that is attached to a first syringe pump which is used to control the delivery rate of the first dope solution. In some instances, the first dope solution may include a mixture of materials dissolved in a solvent, or multiple first dope solutions may be prepared for multiple carbon dioxide selective layers. In some instances, the first dope solution may include other materials, including other polymers, inorganic materials, etc. In some instances, the first dope solution may be prepared in another manner. For example, the mixing process may be heated above room temperature. For another example, vacuum may be applied to degas the solution to remove air bubbles that cause defects in cast films.

At 604, a second dope solution is prepared. For example, the second dope solution includes a material for the supporting layer dissolved in a solvent. The concentration of the material for the supporting layer in the solvent may be controlled depending on the desired properties of the supporting layer (e.g., thickness, porosity, etc.). For example, when the supporting layer includes PVDF, the PVDF can be dissolved in a solvent such as N,N-dimethylacetamide (DMAc), dimethylformamide (DMF), or N-methylpyrrolidone (NMP) to form the second dope solution. The second dope solution may be loaded in a second syringe that is attached to a second syringe pump which is used to control the delivery rate of the first dope solution. In some instances, the second dope solution may include a mixture of materials dissolved in a solvent, or multiple second dope solutions may be prepared for multiple supporting layers. In some instances, the second dope solution may include other materials, including other polymers, inorganic materials, etc. In some instances, the second dope solution may be prepared in another manner. For example, the mixing process may be heated above room temperature. For another example, vacuum may be applied to degas the solution to remove air bubbles that cause defects in cast films.

At 606, one or more fibers are extruded using the first and second dope solution. For example, the first and second dope solution are extruded through a spinneret which has a circular orifice with two concentric tubes connected to the first and second syringes filled with the first and second dope solutions. The spinneret is configured to produce a double-layer hollow fiber by extruding two concentric tubes of the first and second dope solution. In some instances, the spinneret may be modified to include multiple concentric tubes to allow the extrusion of hollow fibers with multiple carbon dioxide selective layers with one or more supporting layers. In some instances, various first dope solutions for various carbon dioxide selective layers can be prepared. In some instances, parameters of the extruding process, for example, pressure, rate, temperature, etc., can be controlled according to the desired properties of the composite hollow fiber.

At 608, the extruded fibers are coagulated and solidified. For example, the extruded composite hollow fibers are immersed in a coagulation bath with one or more nonsolvent and/or temperature change, during which the extruded fibers solidify to form the composite hollow fibers. The coagulated fibers may be rinsed in a nonsolvent and dried for further processing. In some instances, the extruded fibers may be solidified in another manner to evaporate the solvent, for example, passing the fiber through a heated air stream, etc.

FIG. 7 is a flow chart showing aspects of an example fabrication process 700. The fabrication process 700 is used to fabricate the example composite membrane 200, 302 with composite film structure shown in FIG. 2A, 3A.

At 702, a dope solution for the carbon dioxide selective layer is prepared. In some implementations, operation 702 may be implemented as the operation 602 in the example process 600 in FIG. 6 or in another manner.

At 704, a coating of the dope solution is formed on a porous hollow fiber. For example, the coating of the dope solution may be formed on the inner surface or outer surface of the hollow fiber by allowing for the hollow fibers to contact the coating solution. The outer surface of the fibers may be coated by simply immersing the support fibers in the dope solution for a period of time. It can be also achieved by spray coating the dope solution using a spray-coating apparatus. Inside of the fibers may be coated by injecting the dope solution only to the lumen side and allow for the inner fiber surfaces to contact the dope solution, followed by removing the dope solution from the fiber lumens.

At 706, a carbon dioxide selective layer is formed on the porous hollow fiber. In some implementations, the carbon dioxide selective layer is formed on the porous hollow fiber, which may be cured and dried to solidify the coating layer. The coated porous hollow fiber can be rinsed to remove residual coating materials; and can be dried for further processing.

FIG. 8 is a flow chart showing aspects of an example fabrication process 800. The fabrication process 800 is used to fabricate the example composite membrane 200 with a planar composite membrane structure shown in FIG. 2A. In some implementations, operations in the example process 800 may be implemented as the operations of the example process 600, where a slot die having a double-slot structure; and configured to produce a double-layer composite film structure. In some instances, the slot die has multiple slots allowing coextrusion of multiple layers simultaneously. In some instances, the first and second dope solution may be separately extruded and laminated together. In some instances, doctor blades or other techniques may be used. For example, multiple doctor blades can be used to cast thin films in a consecutive manner. A first layer is cast with a doctor blade; and a second layer is cast on top of the first layer with another doctor blade, and so on.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media.

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

In a general aspect, a composite membrane for directly carbon dioxide removal from oceanwater is presented.

In a first example, a composite membrane includes a supporting layer having a first surface and a second, opposite surface; and a carbon dioxide selective layer disposed on the first surface, configured to contact an aqueous solution with dissolved carbon dioxide and to selectively permeates the dissolved carbon dioxide.

Implementations of the first example may include one or more of the following features. The supporting layer comprises polysulfone (PSf), polyethersulfone (PES), polyvinylidene fluoride (PVDF), or a ceramic material. The supporting layer includes at least two of the following: polysulfone (PSf), polyethersulfone (PES), polyvinylidene fluoride (PVDF), and a ceramic material.

Implementations of the first example may include one or more of the following features. The carbon dioxide selective layer includes a silicone-based polymer. The silicon-based polymer includes polydimethylsiloxane (PDMS). The carbon dioxide selective layer includes a polyolefins-based polymer. The polyolefins-based polymer includes polymethylpentene (PMP). The carbon dioxide selective layer includes a fluoropolymer. The carbon dioxide selective layer includes a polyacetylene derived polymer. The polyacetylene derived polymer includes poly(1-trimethylsilyl-1-propyne) (PTMSP). The fluoropolymer includes polytetrafluoroethylene (PTFE). The carbon dioxide selective layer includes at least one of the following: a silicone-based polymer; a polyolefins-based polymer; a polyacetylene derived polymer, or a fluoropolymer.

Implementations of the first example may include one or more of the following features. The carbon dioxide selective layer has a thickness equal to or less than 50 micrometers, equal to or less than 20 micrometers, or equal to or less than 10 micrometers. The carbon dioxide selective layer has a selectivity for the dissolved carbon dioxide gas in the aqueous solution over other dissolved gases in the aqueous solution.

Implementations of the first example may include one or more of the following features. The supporting layer has a hollow cylindrical structure. The first surface is an inner surface of the hollow cylindrical structure; and the second, opposite surface is an outer surface of the hollow cylindrical structure. An inner diameter of the hollow cylindrical structure is equal to or less than 2 millimeters (mm). An outer diameter of the hollow cylindrical structure is equal to or less than 3 mm. The supporting layer has a porous structure. The carbon dioxide selective layer partially fills the porous structure and terminates at a depth between the first and second surfaces of the supporting layer. The aqueous solution comprises oceanwater. A concentration of the carbon dioxide in the aqueous solution is equal to or greater than 1 part per million (ppm). The aqueous solution has a pH value equal to or greater than 4.

In a second example, a method for separating dissolved carbon dioxide gas from an aqueous solution includes obtaining the aqueous solution; contacting the aqueous solution with a first surface of the composite membrane in the first example; and collecting the dissolved carbon dioxide gas from a second opposite surface of the composite membrane.

Implementations of the second example may include one or more of the following features. The method includes prior to contacting the aqueous solution, acidifying the aqueous solution.

In a third example, a system for separating dissolved carbon dioxide gas from an aqueous solution, includes one or more composite membranes in the first example.

Implementations of the third example may include one or more of the following features. The system includes a means for providing a driving force between the first and second surfaces of the composite membrane to cause the dissolved carbon dioxide gas to selectively permeate through the carbon dioxide selective layer from the first surface to the second surface of the composite membrane. The means for providing a driving force between the first and second surfaces of the composite membrane includes a pressure differential across the first and second surfaces of the composite membrane. The pressure differential is equal to or greater than $10^4$ pascals.

Implementations of the third example may include one or more of the following features. The system includes a liquid inlet configured to introduce the aqueous solution to the first surface of the composite membrane; a liquid outlet configured to receive a liquid retentate; a pump configured to pass the aqueous solution from the liquid inlet to the liquid outlet; and a gas outlet configured to collect the permeated carbon dioxide gas. The system includes multiple contactor modules; each contactor module includes a plurality of composite membranes; and the multiple contactor modules are connected to one another in series. The system includes multiple contactor modules; each contactor module includes a plurality of composite membranes; and the multiple contactor modules are connected to one another in parallel. The system further includes a means for monitoring a performance of the composite membrane. The system further includes a means for acidifying the aqueous solution. The dissolved carbon dioxide is in the form of dissolved inorganic carbon (DIC).

In a fourth example, a direct ocean capture system includes the composite membrane of the first example.

Implementations of the fourth example may include one or more of the following features. The direct ocean capture system includes a contactor module which includes the composite membrane configured to separate the reactor into a first chamber and a second chamber, and a control system configured to perform operations including adjusting a pH value of the aqueous solution; feeding the aqueous solution to the first chamber of the contactor module such that the aqueous solution flow through the first chamber at a flow rate and a pressure from a first end to a second opposite end; adjusting a partial pressure in the second chamber of the contactor module; and evaluating a carbon dioxide gas flow rate out of the second chamber of the contactor module.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple implementations separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A system for separating dissolved carbon dioxide gas from an aqueous solution, comprising:
    a contactor module comprising a composite membrane that separates a first chamber from a second chamber in the contactor module, the composite membrane configured to selectively transport, from the first chamber to the second chamber, dissolved carbon dioxide from an aqueous solution in the first chamber, the composite membrane comprising:
        a supporting layer having a first surface and a second, opposite surface; and
        a carbon dioxide selective layer disposed on the first surface, the carbon dioxide selective layer configured to contact the aqueous solution and to selectively transport the dissolved carbon dioxide through the supporting layer; and
    a control system configured to perform operations comprising:
        adjusting a pH value of the aqueous solution;
        feeding the aqueous solution with the adjusted pH value to the first chamber of the contactor module such that the aqueous solution flows through the first chamber from a first end to a second opposite end of the contactor module;
        adjusting a partial pressure in the second chamber of the contactor module; and
        evaluating a carbon dioxide gas concentration collected from the second chamber of the contactor module.

2. The system of claim 1, wherein the carbon dioxide selective layer has a selectivity for the dissolved carbon dioxide gas in the aqueous solution over other dissolved gases in the aqueous solution.

3. The system of claim 1, wherein the carbon dioxide selective layer comprises a silicone-based polymer.

4. The system of claim 1, wherein the carbon dioxide selective layer comprises a polyolefins-based polymer.

5. The system of claim 1, wherein the carbon dioxide selective layer comprises a polyacetylene derived polymer.

6. The system of claim 1, wherein the carbon dioxide selective layer comprises a fluoropolymer.

7. The system of claim 1, wherein the supporting layer has a hollow fiber structure, the first surface is an inner surface of the hollow fiber structure, and the second, opposite surface is an outer surface of the hollow fiber structure.

8. The system of claim 1, wherein the supporting layer has a porous structure.

9. The system of claim 8, wherein the carbon dioxide selective layer partially fills the porous structure of the supporting layer and terminates at a depth between the first and second surfaces of the supporting layer.

10. The composite membrane of claim 1, wherein the carbon dioxide selective layer is a first carbon dioxide selective layer, and the composite membrane comprises a second carbon dioxide selective layer distinct from the first carbon dioxide selective layer.

11. The composite membrane of claim 10, wherein the second carbon dioxide selective layer comprises at least one of the following:
    a silicone-based polymer;
    a polyolefins-based polymer;
    a polyacetylene derived polymer; or
    a fluoropolymer.

12. The system of claim 1, comprising:
    a means for providing a driving force between first and second surfaces of the composite membrane to cause the dissolved carbon dioxide gas to be selectively transported through the carbon dioxide selective layer from the aqueous solution to the second surface of the support layer.

13. The system of claim 12, wherein the means for providing the driving force between the first and second surfaces of the composite membrane comprises:

a pressure differential across the first and second surfaces of the composite membrane.

14. The system of claim 13, wherein the pressure differential is equal to or greater than $10^4$ pascals.

15. The system of claim 1, comprising:
   a liquid inlet on the contactor module configured to introduce the aqueous solution to the first chamber;
   a liquid outlet on the contactor module configured to receive a liquid retentate from the first chamber;
   a pump configured to pass the aqueous solution from the liquid inlet to the liquid outlet; and
   a gas outlet on the contactor module configured to collect a permeated carbon dioxide gas from the second chamber.

16. The system of claim 1, comprising multiple contactor modules, each contactor module comprises a plurality of composite membranes, and the multiple contactor modules are connected to one another in series.

17. The system of claim 1, comprising multiple contactor modules, each contactor module comprises a plurality of composite membranes, and the multiple contactor modules are connected to one another in parallel.

18. The system of claim 1, wherein the aqueous solution comprises dissolved inorganic carbon, adjusting the pH value of the aqueous solution comprises acidifying the aqueous solution to the adjusted pH value, and acidifying the aqueous solution comprises:
   mixing an acid with the aqueous solution; and
   converting the dissolved inorganic carbon in the aqueous solution to the dissolved carbon dioxide.

19. The system of claim 18, wherein the aqueous solution comprises oceanwater.

20. The system of claim 19, wherein the adjusted pH of the acidified oceanwater is equal to or greater than 4.

* * * * *

UNITED STATES PATENT AND TRADEMARK OFFICE
CERTIFICATE OF CORRECTION

PATENT NO. : 12,202,743 B2
APPLICATION NO. : 18/611463
DATED : January 21, 2025
INVENTOR(S) : Kim et al.

Page 1 of 1

It is certified that error appears in the above-identified patent and that said Letters Patent is hereby corrected as shown below:

In the Claims

Column 14, Line 46 In Claim 10 delete "composite membrane" and insert -- system -- therefor Column 14, Line 51 In Claim 11 delete "composite membrane" and insert -- system -- therefor Signed and Sealed this
First Day of April, 2025

Coke Morgan Stewart
*Acting Director of the United States Patent and Trademark Office*